(12) United States Patent  
Lee

(10) Patent No.: US 7,300,071 B2
(45) Date of Patent: Nov. 27, 2007

(54) SHOCK ABSORBING DEVICE FOR STEERING COLUMNS

(75) Inventor: Byeong-Hoon Lee, Kyunggi-do (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 210 days.

(21) Appl. No.: 11/003,434

(22) Filed: Dec. 6, 2004

(65) Prior Publication Data
US 2006/0049620 A1 Mar. 9, 2006

(30) Foreign Application Priority Data
Sep. 6, 2004 (KR) ............. 10-2004-0070738

(51) Int. Cl.
B62D 1/11 (2006.01)
(52) U.S. Cl. ........................... 280/777; 74/492
(58) Field of Classification Search ............ 280/777, 280/779; 74/492, 493
See application file for complete search history.

(56) References Cited

U.S. PATENT DOCUMENTS

| 4,194,411 | A | * | 3/1980 | Manabe et al. | ........ | 74/492 |
| 5,425,553 | A | * | 6/1995 | Yazane et al. | ........ | 280/777 |
| 5,452,917 | A | * | 9/1995 | Fujiu et al. | ........ | 280/777 |
| 5,615,916 | A | * | 4/1997 | Fujiu et al. | ........ | 280/777 |
| 6,378,903 | B1 | * | 4/2002 | Yabutsuka et al. | ........ | 280/777 |

FOREIGN PATENT DOCUMENTS

| JP | 53-124834 | * | 10/1978 |
| JP | 58-167253 | * | 10/1983 |
| KR | 2000-10034 |   | 2/2000 |

OTHER PUBLICATIONS

English language Abstract of Korean 2000-10034.
U.S. Appl. No. 10/720,381, filed Nov. 25, 2003.

* cited by examiner

Primary Examiner—Eric Culbreth
(74) Attorney, Agent, or Firm—Greenblum & Bernstein, P.L.C.

(57) ABSTRACT

A shock absorbing device for steering columns, which has a bracket and a capsule placed around a capsule locking slot of the bracket and fastened along with the bracket to a vehicle body by a locking bolt, is disclosed. The capsule includes an upper plate, a lower plate, and a connector which connects an end of the upper plate to an end of the lower plate. The shock absorbing device further includes a stopper which is provided between the upper plate and the lower plate of the capsule such that the stopper is placed in the capsule locking slot of the bracket. The upper plate of the capsule is bent at an outside edge thereof. The stopper is thinner than the bracket around the capsule locking slot. Furthermore, the upper plate and the lower plate of the capsule are configured such that the upper and lower plates are vertically aligned with each other at outside ends of extensions thereof.

9 Claims, 3 Drawing Sheets

[FIG. 1] PRIOR ART
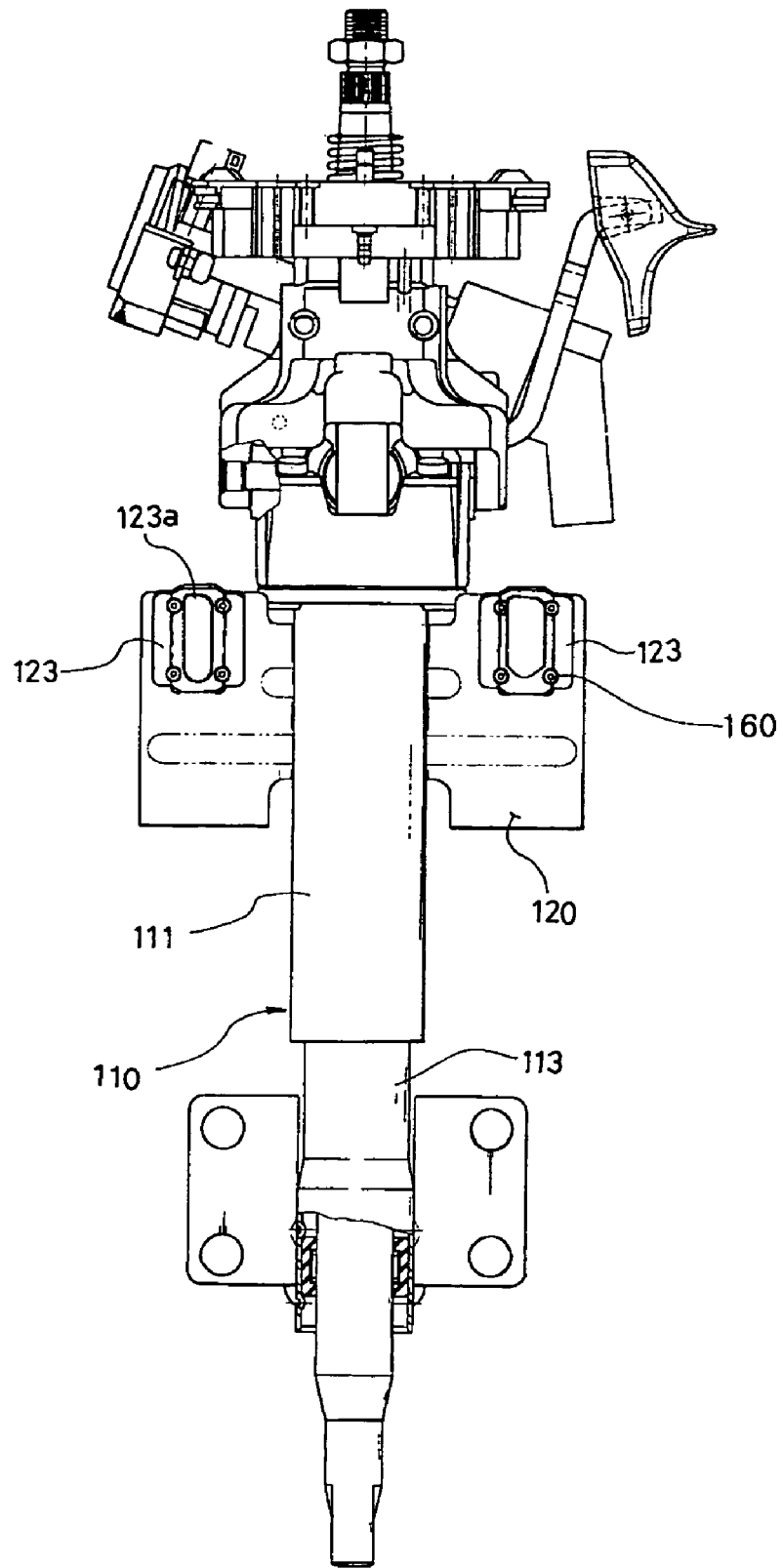

[FIG. 2] PRIOR ART
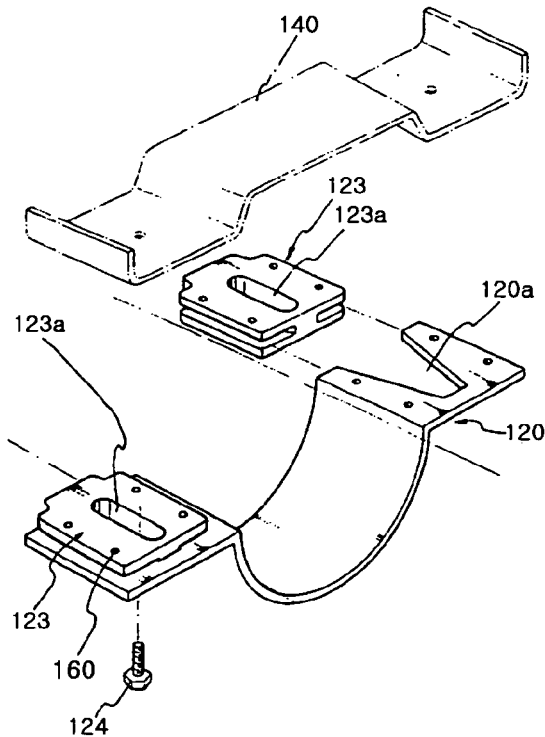
[FIG. 3]
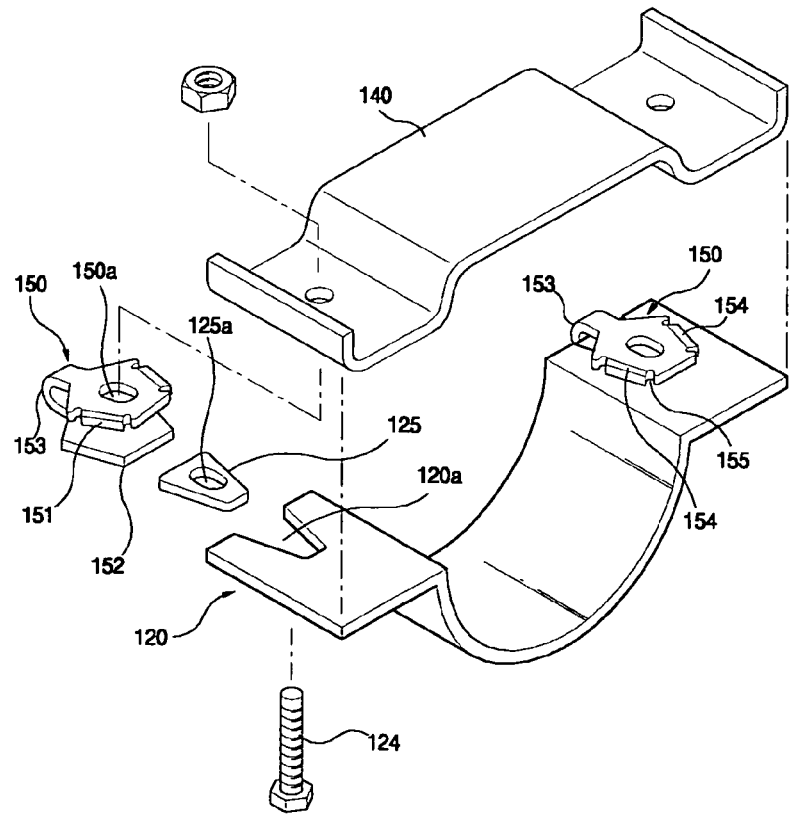

[FIG. 4]
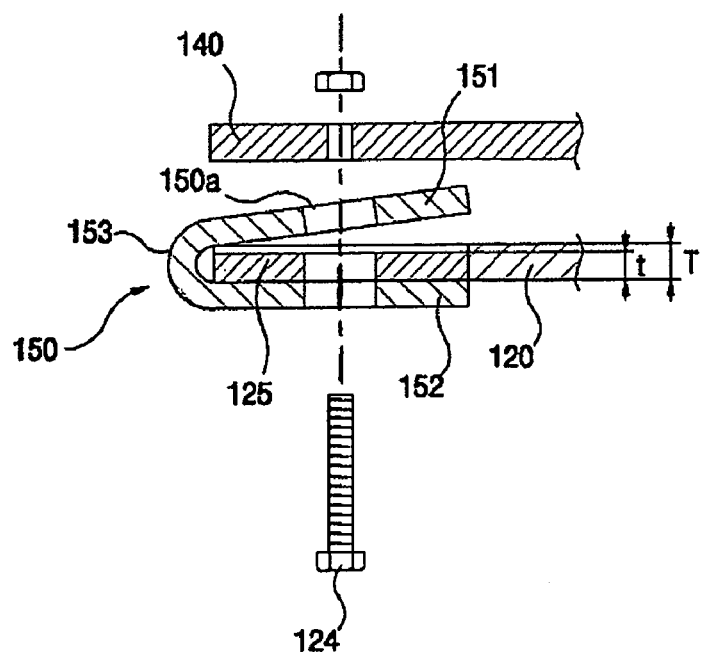
[FIG. 5]
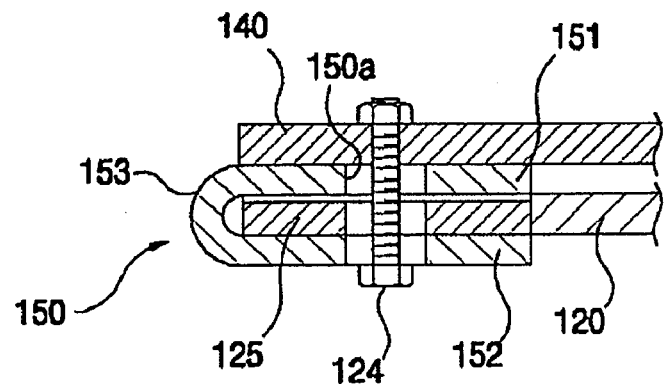
[FIG. 6]
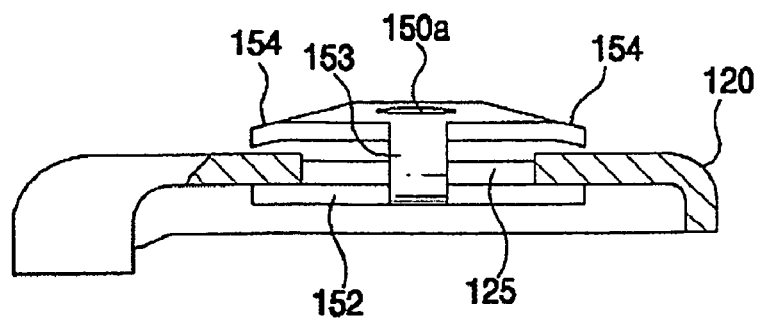

SHOCK ABSORBING DEVICE FOR STEERING COLUMNS

RELATED APPLICATIONS

The present disclosure relates to subject matter contained in priority Korean Application No. 10-2004-0070738, filed on Sep. 6, 2004, which is herein expressly incorporated by reference in its entirety.

BACKGROUND OF THE INVENTION

1. Field of the Invention

The present invention relates, in general, to shock absorbing devices for steering columns and, more particularly, to a shock absorbing device for steering columns which has a simple construction and is easily produced, and is capable of absorbing a high impact.

2. Description of the Related Art

To absorb a collision impact which may be transferred to a driver through a steering column when a vehicle is involved in a collision, and to protect the driver from such a collision impact, a shock absorbing device is used with the steering column. An example of conventional shock absorbing devices for steering columns is referred to in Korean Patent Laid-open Publication No. 2000-10034.

Generally, the steering apparatus of an automotive vehicle comprises a manipulation mechanism through which a driver inputs a steering motion and the steering motion is transmitted to both a steering gear mechanism and a link mechanism. The steering gear mechanism reduces the rotation angle of a steering shaft of the manipulation mechanism, thus increasing a driver's steering force, and converts the direction of the steering motion. The link mechanism transits the motion of the steering gear mechanism to the front wheels while supporting the positional relation between the left and right wheels. The steering shaft of the manipulation mechanism is surrounded by a steering column, with a shock absorbing device provided on the steering column to protect the driver from a collision impact which may be transferred to the driver through the steering shaft and the steering wheel when the vehicle is involved in a collision.

The shock absorbing device allows both the steering shaft and the steering column to be deformed in response to a collision impact, thus absorbing the impact energy. Conventional shock absorbing devices for steering columns are typically classified into three types: mesh-type shock absorbing devices using steering columns having net structures capable of contracting in response to a collision impact, thereby absorbing impact energy, bellows-type shock absorbing devices using bellows tubes; and ball and sleeve-type shock absorbing devices using balls and sleeves.

The three above-mentioned types of conventional shock absorbing devices are configured to absorb a collision impact energy through contracting and buckling. In addition to the three types of conventional shock absorbing devices, another type of shock absorbing device having capsules provided outside a steering column and breaking in response to a collision impact, thus absorbing impact energy, has been proposed and used.

As shown in FIGS. 1 and 2, a conventional shock absorbing device with capsules is mounted to a vehicle body 140 using a bracket 120 as well as the capsules 123. The bracket 120 has a capsule locking slot 120a at each end thereof, while each of the capsules 123 made of aluminum has a longitudinal hole 123a. The shock absorbing device is mounted to the vehicle body 140 by engaging the capsules 123 in the slots 120a of the bracket 120 and locking the capsules 123 to the vehicle body 140 using locking bolts 124 which pass through the longitudinal holes 123a of the capsules 123. The capsules 123 are breakably assembled with the bracket 120 using plastic pins 160. The plastic pins 160 are broken in response to a collision impact, thus executing a shock absorbing function, in addition to the function of breakably assembling the capsules 123 with the bracket 120.

When a collision impact is transmitted upwards through a steering column 110, the upper jacket 111 of the steering column 110 moves downwards along the outside surface of the lower jacket 113. Thus, the steering column 110 contracts and buckles, thereby primarily absorbing impact energy. At this time, the bracket 120 which moves along with the upper bracket 111 in the same direction is quickly separated from the capsules 123 bolted to the vehicle body 140. Therefore, the plastic pins 160, which have breakably assembled the capsules 123 with the bracket 120, are broken, thus secondarily absorbing the impact energy and reducing injury to a driver due to the impact.

However, each of the capsules 123 must be configured to have a complex shape capable of undergoing an assembly process which has been typically executed through plastic injection molding to assemble the capsules 123 with the bracket 120, so that aluminum die-cast products have been preferably used as the capsules 123. However, due to the intrinsic properties of aluminum, the aluminum die-cast capsules 123 easily break during a process of assembling the capsules 123 with the vehicle body 140 or when the vehicle body 140 vibrates. Thus, the operational reliability of the shock absorbing device is reduced. Furthermore, a part of each of the aluminum die-cast capsules 123 must be post-processed after die-casting, thus increasing the manufacturing costs of the shock absorbing devices. When the plastic pins 160 are formed on the capsules 123 through plastic injection molding to breakably lock the capsules 123 to the bracket 120, the injection molding work conditions are remarkably changed according to operational reliability and stability of a molding machine. Thus, the separation load imposed on the plastic pins 160 to separate the bracket 120 from the capsules 123 is distributed in an excessively large range, so that the shock absorbing function of the plastic pins 160 is reduced. Furthermore, when a vehicle runs, the capsules 123 may become detached from the bracket 120 or fail to perform a designed shock absorbing function when an excessive impact is applied thereto. Furthermore, the capsules 123 have complex structures, thus increasing manufacturing costs and entailing complex assembly processes of the shock absorbing devices.

SUMMARY OF THE INVENTION

Accordingly, the present invention has been made keeping in mind the above problems occurring in the related art, and an object of the present invention is to provide a shock absorbing device for steering columns, which has a simple construction and is easily produced, and is capable of absorbing a high impact.

In order to achieve the above object, the present invention provides a shock absorbing device for steering columns, comprising a bracket, and a capsule placed around a capsule locking slot of the bracket and fastened along with the bracket to a vehicle body, wherein the capsule comprises an upper plate, a lower plate, and a connector which connects an end of the upper plate to an end of the lower plate. The above-mentioned shock absorbing device may further comprise a stopper provided between the upper plate and the lower plate of the capsule such that the stopper is placed in the capsule locking slot of the bracket. Furthermore, the upper plate of the capsule is preferably bent at an outside edge thereof. The stopper is preferably thinner than the bracket around the capsule locking slot. Furthermore, the upper plate and the lower plate of the capsule are preferably configured such that the upper and lower plates are vertically aligned with each other at outside ends of extensions thereof.

The present invention simplifies the construction of the shock absorbing device, and allows the device to absorb a high impact.

BRIEF DESCRIPTION OF THE DRAWINGS

The above and other objects, features and other advantages of the present invention will be more clearly understood from the following detailed description when taken in conjunction with the accompanying drawings, in which:

FIG. 1 is a front view of a steering column provided with a conventional shock absorbing device;

FIG. 2 is an exploded perspective view of the conventional shock absorbing device for steering columns;

FIG. 3 is an exploded perspective view of a shock absorbing device for steering columns according to a preferred embodiment of the present invention;

FIG. 4 is a sectional view of the shock absorbing device for steering columns according to the preferred embodiment of the present invention before the shock absorbing device is mounted to a vehicle body, FIG. 5 is a sectional view of the shock absorbing device for steering columns according to the preferred embodiment of the present invention after the shock absorbing device is mounted to the vehicle body, and FIG. 6 is a sectional view showing the structure for assembling an important part of the shock absorbing device for steering columns according to the preferred embodiment of the present invention.

DETAILED DESCRIPTION OF THE INVENTION

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 3 is an exploded perspective view of a shock absorbing device for steering columns according to a preferred embodiment of the present invention.

As shown in FIG. 3, the shock absorbing device to absorb a collision impact which may be transmitted to a driver through a steering column comprises two capsules 150 which engage with a bracket 120 and are mounted along with the bracket 120 to a vehicle body 140. The two capsules 150 have the same construction and operation so that, in the following description, one of the two capsules 150 will be described. The capsule 150 comprises an upper plate 151, a lower plate 152, and a connector 153 which connects an end of the upper plate 151 to an end of the lower plate 152, thus providing a single body having a U-shaped cross-section. The capsule 150 further has a longitudinal hole 150a.

As shown in FIG. 5, the capsule 150 having the U-shaped cross-section is placed to cover a predetermined portion of the bracket 120. In a detailed description, the bracket 120 has a capsule locking slot 120a at each end thereof, while the capsule 150 is placed over the predetermined portion of the bracket 120 so that the upper and lower plates 151 and 152 of the capsule 150 are placed above and below the bracket 120 to cover the capsule locking slot 120a. Thereafter, the capsule 150 is mounted to a vehicle body 140 by a locking bolt 124 which is locked to the vehicle body 140 after passing through both the longitudinal hole 150a of the capsule 150 and the capsule locking slot 120a of the bracket 120. Thus, the upper and lower plates 151 and 152 of the capsule 150 come into contact with the upper and lower surfaces of the bracket 120, with a frictional force acting on the contact surfaces between the capsule 150 and the bracket 120. In that case, the locking bolt 124 is appropriately tightened to compress the capsule 150, thus increasing the frictional force acting on the contact surfaces between the bracket 120 and the capsule 150. This means that the bracket 120 is fastened to the capsule 150 due to a static frictional force which acts on the contact surfaces between the bracket 120 and the upper and lower plates 151 and 152 of the capsule 150.

The longitudinal hole 150a of the capsule 150 serves as a bolt hole, through which the locking bolt 124 passes. Furthermore, when the bracket 120 moves relative to the vehicle body 140 in response to a collision impact, the longitudinal hole 150a allows the capsule 150 to move along with the bracket 120 relative to the vehicle body 140 by a distance equal to the length of the longitudinal hole 150a. Thus, the collision impact is primarily absorbed. When the moving distance of the bracket 120 exceeds a range allowed by the length of the longitudinal hole 150a, the bracket 120 is completely removed from the capsule 150. In that case, the bracket 120 must overcome the frictional force acting on the contact surfaces between the bracket 120 and the capsule 150, so that the collision impact is secondarily absorbed. Thus, the capsule 150 can absorb a collision impact higher than that absorbed by conventional capsules, the plastic pins of which are broken in response to a collision impact.

The shock absorbing device further comprises a stopper 125. The stopper 125 is provided between the upper plate 151 and the lower plate 152 of the capsule 150, with a longitudinal hole 125a formed on the stopper 125 so that the locking bolt 124 passes through the hole 125a. The stopper 125 is placed in the capsule locking slot 120a of the bracket 120. The stopper 125 is preferably inserted into the capsule locking slot 120a such that opposite side surfaces of the stopper 125 come into contact with corresponding surfaces of the slot 120a, thus allowing a frictional force to act on the contact surfaces between the stopper 125 and the slot 120a. Due to the frictional force acting on the contact surfaces between the stopper 125 and the slot 120a, the collision impact is further absorbed. The stopper 125 is mounted along with the capsule 150 to the vehicle body 140 by the locking bolt 124 which passes through the longitudinal hole 125a To allow the stopper 125 to be easily inserted into the capsule locking slot 120a, the stopper 125 is preferably configured to have a trapezoidal shape.

As described above, the locking bolt 124 is tightened to compress the capsule 150 and increase the frictional force acting on the contact surfaces between the bracket 120 and the capsule 150. When the capsule 150 is excessively compressed by the locking bolt 124, the bracket 120 may remain assembled with the capsule 150 without being separated from the capsule 150 until a high separation force is applied thereto. In that case, the shock absorbing device may fail to execute its desired shock absorbing function. Furthermore, the excessively tightened locking bolt 124 deforms the shapes of the upper and lower plates 151 and 152 of the capsule 150, and reduces the contact surface area between the bracket 120 and the capsule 150. To prevent such excessive compression of the capsule 150, the stopper 125 is placed between the upper and lower plates 151 and 152 of the capsule 150. When the locking bolt 124 is tightened to compress the capsule 150 to a level exceeding a predetermined reference level, the stopper 125 supports the upper and lower plates 151 and 152 so that the plates 151 and 152 are not further compressed. This means that the stopper 125 prevents the capsule 150 from being excessively compressed by the locking bolt 124. Thus, desired close contact of the capsule 150 with the bracket 120 is accomplished.

In the shock absorbing device of the present invention, the stopper 125 is preferably thinner than the bracket 120 around the capsule locking slot 120a. That is, the thickness t of the stopper is less than the thickness T of the bracket 120 around the capsule locking slot 120a. Thus, the stopper 125 allows the capsule 150 to be appropriately compressed up to the predetermined reference level, but prevents the capsule 150 from being excessively compressed beyond the predetermined reference level. Furthermore, the compression force to be applied to the capsule 150 by the locking bolt 124 may be controlled by changing the thickness t of the stopper 125. Thus, due to the controlled compression force, the frictional force acting on the contact surface between the capsule 150 and the bracket 120 can be controlled.

In the shock absorbing device of the present invention, the upper plate 151 and the lower plate 152 of the capsule 150 are configured such that the upper and lower plates 151 and 152 are vertically aligned with each other at outside ends of extensions thereof, as shown in FIG. 4. To allow the capsule 150 to be easily fitted over the bracket 120, thus causing easy false assembly of the capsule 150 with the bracket 120 during a process of assembling the shock absorbing device with the vehicle body 140, it is preferred to slightly open the upper plate 151 relative to the lower plate 152. Of course, when the capsule 150 is fastened to the vehicle body 140 by the locking bolt 124, the slightly opened upper plate 151 is compressed, thus being closed. FIG. 5 is a sectional view illustrating the capsule 150 after the capsule 150 is mounted to the vehicle body 140. As shown in FIG. 5, the capsule 150 is fastened to the vehicle body 140 by the locking bolt 124 which passes through the longitudinal hole 150a of the capsule 150. At the time, the locking bolt 124 compresses the slightly opened upper plate 151 of the capsule 150, thus closing the upper plate 151. Therefore, the capsule 150 is stably fastened to the vehicle body 140 and is in close contact with the body 140.

The connector 153 between the upper and lower plates 151 and 152 of the capsule 150 is preferably configured like a throat, so that the slightly opened upper plate 151 can be closed by a reasonable force while fastening the capsule 150 to the vehicle body 140.

The upper plate 151 of the capsule 150 is bent at an outside edge thereof. The upper plate 151 may be cut at several positions along the outside edge thereof to form notches 155, so that parts of the outside edge between the notches 155 can be easily bent to form bent parts 154. Thus, it is possible to bend only the outside edge of the upper plate 151. Alternatively, only opposite left and right side parts of the outside edge of the upper plate 151 may be bent to form the bent parts 154 as shown in the drawings. The bent parts 154 are formed by bending the edge of the upper plate 151 toward the bracket 120 as shown in FIG. 6. When the capsule 150 false-assembled with the bracket 140 is fastened to the vehicle body 140, the bent parts 154 are compressed and deformed, so that a reaction force is generated in the bent parts 154 and acts on both the vehicle body 140 and the bracket 120. Thus, the vehicle body 140, the bracket 120 and the capsule 150 are in strong, close contact with each other, as if they were integrally formed as a single structure.

The shock absorbing device for steering columns according to the present invention is not limited to the above-mentioned embodiment, and various changes and modifications may be made in the present invention without departing from the scope and spirit of the invention as disclosed in the accompanying claims and the specification, and illustrated in the accompanying drawings.

As described above, the shock absorbing device for steering columns according to the present invention comprises a bracket, and a capsule placed around a capsule locking slot of the bracket and fastened along with the bracket to a vehicle body by a locking bolt, wherein the capsule comprises an upper plate, a lower plate, and a connector which connects an end of the upper plate to an end of the lower plate.

In the shock absorbing device, the capsule is in frictional contact with the bracket, so that a collision impact can be absorbed by being offset by the frictional force acting on the contact surface between the capsule and the bracket. The capsule can be further compressed by increasing the tightening force of the locking bolt. Thus, the frictional force acting on the contact surface between the capsule and the bracket may be increased, so that the capsule can absorb high impact energy. The bracket is retained in its assembled state with the capsule by the frictional force, so that the bracket is not easily separated from the capsule while a vehicle runs. Furthermore, the capsule has a simple structure and a simple shape, thus being easily produced at low manufacturing and assembling costs.

In the shock absorbing device, a stopper is provided between the upper plate and the lower plate of the capsule such that the stopper is placed in the capsule locking slot of the bracket. Thus, when the capsule is compressed beyond a predetermined level, the stopper supports the upper and lower plates so that the plates are not further compressed. Due to the above-mentioned structure, it is possible to prevent an excessive increase in the separation force which can cause the bracket to become separated from the capsule when it is applied to the bracket. Furthermore, the above-mentioned structure prevents the upper plate of the capsule from being excessively deformed, so that the capsule and the bracket are in close contact with each other. The stopper is thinner than the bracket around the capsule locking slot. Thus, the stopper allows the capsule to be appropriately compressed up to the predetermined level, but prevents the capsule from being excessively compressed beyond the predetermined level. Furthermore, the compression force to be applied to the capsule by the locking bolt may be controlled by changing the thickness of the stopper. Thus, the frictional force acting on the contact surface between the capsule and the bracket can be controlled. This means that it is possible to control the amount of impact which can be absorbed by the capsule.

In the shock absorbing device, the upper plate of the capsule is configured such that the upper plate is slightly opened relative to the lower plate, and is vertically aligned with the lower plate at outside ends of extensions thereof when the upper and lower plates are compressed. The above-mentioned structure causes easy false assembly of the capsule with the bracket. During a process of assembling the shock absorbing device with the vehicle body, the slightly opened upper plate is compressed by a tightening force of the locking bolt, thus being in close contact with the vehicle body. Therefore, the capsule is not easily separated from the vehicle body while the vehicle runs, but stably and effectively absorbs impact energy.

Furthermore, the upper plate of the capsule is bent at an outside edge thereof, thus providing a bent part. The bent part is deformed during the process of assembling the shock absorbing device with the vehicle body, thus imposing a reaction force on both the vehicle body and the bracket. Therefore, the vehicle body, the bracket and the capsule are in strong, close contact with each other.

What is claimed is:

1. A shock absorbing device for steering columns, comprising:
   a bracket having a capsule locking slot which receives a stopper; and
   a capsule placed around the capsule locking slot of the bracket such that the stopper is provided between an upper and lower plate of the capsule, the capsule further comprising a connector which connects an end of the upper plate to an end of the lower plate, the capsule and stopper each having elongated slots configured to receive a fastener such that the capsule is configured to move relative to the bracket, and the stopper being thinner than the bracket around the capsule locking slot.

2. The shock absorbing device for steering columns as set forth in claim 1, wherein the upper plate of the capsule is bent at an outside edge.

3. The shock absorbing device for steering columns as set forth in claim 2, wherein the upper plate and the lower plate of the capsule are configured such that the upper and lower plates each have extensions which are vertically aligned with each other at respective outside ends.

4. The shock absorbing device for steering columns as set forth in claim 1, wherein the upper plate and the lower plate of the capsule are configured such that the upper and lower plates each have extensions which are vertically aligned with each other at respective outside ends.

5. A shock absorber for steering columns, comprising:
   a bracket having a capsule locking slot which receives a stopper; and
   a capsule placed around the capsule locking slot of the bracket such that the stopper is provided between an upper and lower plate of the capsule, wherein the capsule comprises a connector which connects an end of the upper plate to an end of the lower plate, and wherein a thickness of the stopper is less than a thickness of the bracket which surrounds the capsule locking slot.

6. The shock absorbing device for steering columns as set forth in claim 5, wherein the upper plate of the capsule is bent at an outside edge.

7. The shock absorbing device for steering columns as set forth in claim 6, wherein the upper plate and the lower plate of the capsule are configured such that the upper and lower plates each have extensions which are vertically aligned with each other at respective outside ends.

8. The shock absorbing device for steering columns as set forth in claim 5, wherein the upper plate and the lower plate of the capsule are configured such that the upper and lower plates each have extensions which are vertically aligned with each other at respective outside ends.

9. The shock absorbing device for steering columns as set forth in claim 8, wherein the upper plate of the capsule is bent at an outside edge.

* * * * *